(12) United States Patent
Brice et al.

(10) Patent No.: US 12,165,542 B2
(45) Date of Patent: Dec. 10, 2024

(54) MOTION PLATFORM

(71) Applicant: McLaren Racing Limited, Surrey (GB)

(72) Inventors: Peter Brice, Woking (GB); Steve Houghton, Woking (GB)

(73) Assignee: McLaren Racing Limited, Woking (GB)

( * ) Notice: Subject to any disclaimer, the term of this patent is extended or adjusted under 35 U.S.C. 154(b) by 376 days.

(21) Appl. No.: 15/757,246

(22) PCT Filed: Sep. 1, 2016

(86) PCT No.: PCT/GB2016/052702
§ 371 (c)(1),
(2) Date: Mar. 2, 2018

(87) PCT Pub. No.: WO2017/037458
PCT Pub. Date: Mar. 9, 2017

(65) Prior Publication Data
US 2018/0247557 A1   Aug. 30, 2018

(30) Foreign Application Priority Data
Sep. 4, 2015 (GB) ..................... 1515730

(51) Int. Cl.
*A63G 31/16* (2006.01)
*G09B 9/04* (2006.01)

(52) U.S. Cl.
CPC .............. *G09B 9/04* (2013.01); *A63G 31/16* (2013.01)

(58) Field of Classification Search
CPC ... G09B 9/00; G09B 9/02; G09B 9/04; A63G 31/02; A63G 31/16
See application file for complete search history.

(56) References Cited

U.S. PATENT DOCUMENTS

| | | | | |
|---|---|---|---|---|
| 2,560,499 A | * | 7/1951 | Warry | B66D 1/50 187/244 |
| 5,433,608 A | * | 7/1995 | Murray | G09B 9/14 434/29 |

(Continued)

FOREIGN PATENT DOCUMENTS

| | | |
|---|---|---|
| EP | 1313080 A1 | 5/2003 |
| EP | 2394720 A2 | 12/2011 |

(Continued)

OTHER PUBLICATIONS

Ministero Dello Sviluppo Economico Direzione Generale Per La Lotta Alla Contraffazione Ufficio Italiano Brevetti E Marchi; Domanda Di Invenzione Numero 102015000040968; "Apparato Per La Simulazione Della Conduzione Di Un Veicolo Terrestre"; filing date, Jul. 31, 2015; publication date, Jan. 31, 2017.*

(Continued)

*Primary Examiner* — Bruk A Gebremichael
(74) *Attorney, Agent, or Firm* — Fish & Richardson P.C.

(57) ABSTRACT

A motion system comprising: a carriage disposed in a working volume; a primary motion system comprising a plurality of cable drives disposed around the working volume, there being a flexible cable extending from each cable drive to the carriage, whereby the carriage can be caused to translate in two degrees of freedom with respect to a reference frame; and a secondary motion system extending between the carriage and the payload to support the payload with respect to the carriage, whereby the payload can be caused to move in a further degree of freedom with respect to the reference frame.

14 Claims, 3 Drawing Sheets

(56) References Cited

U.S. PATENT DOCUMENTS

| | | | |
|---|---|---|---|
| 5,919,045 A * | 7/1999 | Tagge | A63F 13/08 434/62 |
| 8,920,251 B2 | 12/2014 | Dietz et al. | |
| 2004/0077464 A1 | 4/2004 | Feldman et al. | |
| 2005/0042578 A1 | 2/2005 | Ammon et al. | |
| 2009/0266266 A1 * | 10/2009 | Kilbert | A63G 21/08 104/53 |
| 2010/0266991 A1 | 10/2010 | Gregoire et al. | |
| 2014/0274431 A1 | 9/2014 | Schmidt | |
| 2015/0157951 A1 | 6/2015 | Lee et al. | |
| 2017/0053548 A1 | 2/2017 | Warne | |

FOREIGN PATENT DOCUMENTS

| | | |
|---|---|---|
| EP | 3133575 A1 | 2/2017 |
| JP | H08 215429 A | 8/1996 |
| WO | WO 95/05223 A1 | 2/1995 |
| WO | WO 2007/011362 A2 | 1/2007 |
| WO | WO 2017/021323 A1 | 2/2017 |

OTHER PUBLICATIONS

Patent Translate; Description ITUB20152709, "Apparatus for the Simulation of the Driving of a Land Vehicle"; Translation date, May 7, 2020.*

International Search Report and Written Opinion for corresponding Appl No. PCT/GB2016/052702, dated Feb. 3, 3017; 20 pages.

Elvedin Kljuno et al: "Vehicle Simulation System: Controls and Virtual-reality-based Dynamics Simulation", J Intell Robot Syst; Theory and Applications—(Incorporating Mechatronic Systems Engineering), Kluwer Academic Publishers, DO, vol. 52, No. 1, Feb. 16, 2008 (Feb. 16, 2008), pp. 79-99, XP019607201, ISSN: 1573-0409 the whole document.

European examination report for corresponding EP Appl No. 16 766 595.9, dated Aug. 22, 2019.

"Auslegung und Betrieb redundanter paralleler Seilroboter", dissertation of Tobias Bruckmann, University of Duisberg-Essen 2010, figure 8.8 "Design and operation redundant parallel rope robot", dissertation of Tobias Bruckmann, University of Duisberg-Essen 2010, figure 8.8.

[No Author Listed], "Electric Simulation Table Next Generation Testing: Designed for Hardware and Human in the Loop Simulation and Testing," MOOG, 2012, 8 pages.

[No Author Listed], [online], "Seilroboter der Universität Duisburg Essen (Regalbediengerät)," University of Duisburg Essen, Apr. 30, 2014, retrieved on Jul. 6, 2021, <https://www.youtube.com/watch?v=qYniKNuUGA4>, 4 pages (with English Translation) [Video Submission].

Nads.uiowa.edu [online], "Iowa: College of Engineering; National Advanced Driving Simulator," Mar. 15, 2021, retrieved on Jul. 6, 2021, retrieved from URL <https://nads.uiowa.edu/>, 6 pages.

EP Notice of Opposition in European Appln. No. 16766595, dated Aug. 9, 2021, 30 pages.

Opposition, "Campbell et al., "Experimental Design for Human-in-the-Loop Driving Simulations," Electrical Engineering and Computer Sciences University of California at Berkeley, May 11, 2015," Exhibit D5, in European Appln. No. 16766595, dated Aug. 8, 2021, 35 pages.

Opposition, "EP 3133575 A1," Exhibit D2 in European Appln. No. 16766595, dated Aug. 8, 2021, 51 pages.

Opposition, "US 2004/0077464 A1," Exhibit D9 in European Appln. No. 16766595, dated Aug. 8, 2021, 21 pages.

Opposition, "US 2005/0042578 A1," Exhibit D6 in European Appln. No. 16766595, dated Aug. 8, 2021, 21 pages.

Opposition, "US 2010/0266991 A1," Exhibit D8 in European Appln. No. 16766595, dated Aug. 8, 2021, 70 pages.

Opposition, "US 2014/0274431 A1," Exhibit D3 in European Appln. No. 16766595, dated Aug. 8, 2021, 18 pages.

Opposition, "U.S. Pat. No. 8,920,251 B2," Exhibit D7 in European Appln. No. 16766595, dated Aug. 8, 2021, 35 pages.

Opposition, "WO 2007/011362 A2," Exhibit D4 in European Appln. No. 16766595, dated Aug. 8, 2021, 18 pages.

Opposition, "WO 2017/021323 A," Exhibit D1 in European Appln. No. 16766595, dated Aug. 8, 2021, 27 pages.

EP Brief Communication in European Appln. No. 16766595, dated Jan. 5, 2022, 44 pages.

EP Reply of the patent proprietor to the notice(s) of opposition, European Appln. No. 16766595, filed Dec. 23, 2021, 13 pages.

EP Summons to attend Oral Proceedings in European Appln. No. 16766595, dated Mar. 24, 2022, 17 pages.

* cited by examiner

MOTION PLATFORM

CROSS-REFERENCE TO RELATED APPLICATIONS

This application is a national stage of and claims priority under 35 U.S.C. § 371 to PCT Application No. PCT/GB2016/052702, filed on Sep. 1, 2016, which claims priority to British Application No. GB1515730.8, filed on Sep. 4, 2015. The contents of both of these priority applications are hereby incorporated by reference in their entirety.

This invention relates to a motion platform. The motion platform may, for instance, be used for a road vehicle simulator.

Motion platforms are used for a variety of applications. Examples include vehicle simulators, moving parts around tooling stations, shelf stacking and camera tracking. A common form of motion platform is the Stewart Platform, or hexapod. This comprises six linear actuators extending between a base and a payload. Each linear actuator is attached by spherical joints to the base and the payload, and the linear actuators are arranged so that in combination they can move the payload in six degrees of freedom relative to the base. The Stewart Platform is commonly used for vehicle simulators. However, it has a number of disadvantages. One disadvantage is that its range of motion in translational degrees of freedom is restricted by the size of the linear actuators, which in turn limits the fidelity of the motion the system can provide. Another disadvantage is that its range of rotation about an axis perpendicular to the base is inherently restricted to around +/−25° in a typical system (see. http://www.moog.com/literature/ICD/Moog-Test-Electric_Simulation_Table-Overview-en.pdf) by the potential for clashing between the linear actuators.

Various other designs of motion platform are available. One example is a cable-actuated shelf stacking robot (see FIG. 8.8, "Auslegung and Betrieb redundanter paralleler Seilroboter", dissertation of Tobias Bruckmann, University of Duisberg-Essen, 2010, and https://www.youtube.com/watch?v=qYniKNuUGA4). This provides a payload in the form of a horizontal shelf. The payload is supported by cables running over pulleys disposed at the corners of a vertical rectangular frame. The cables run to motor-driven rollers, which can be operated to translate the payload in the vertical plane. Other designs of cable-actuated robot are additionally able to cause rotation of the payload as it translates in a vertical plane.

The National Advanced Driving Simulator (www.nads-sc.uiowa.edu) comprises a platform mounted on a hexapod, with the base of the hexapod being movable on rails in a horizontal plane. This provides additional lateral motion over what can be generated by the hexapod alone, but the system is bulky and that limits its ability to impose high-frequency accelerations. Other systems have a hexapod driven horizontally by additional horizontally directed linear actuators.

There is a need for an improved design of motion platform.

According to one aspect there is provided a motion system comprising: a carriage disposed in a working volume; a primary motion system comprising a plurality of cable drives disposed around the working volume, there being a flexible cable extending from each cable drive to the carriage, whereby the carriage can be caused to translate in two or more degrees of freedom with respect to a reference frame; and a secondary motion system extending between the carriage and the payload to support the payload with respect to the carriage, whereby the payload can be caused to move in one or more further degrees of freedom with respect to the reference frame.

According to a second aspect there is provided a motion system comprising: a carriage disposed in a working volume; a primary motion system comprising a plurality of cable drives disposed around the working volume, there being a flexible cable extending from each cable drive to the carriage, whereby the carriage can be caused to translate in at least two degrees of freedom with respect to a reference frame, the cables being arranged such that there is a configuration of the carriage in which at least one of the cables is wound round the carriage in a first rotational direction and at least another one of the cables is wound around the carriage in a second rotational direction, whereby the carriage can be caused to rotate through at least 90° by operation of the cable drives.

According to a third aspect there is provided a method for simulating the operation of a vehicle, the method comprising operating a motion system as claimed in any preceding claim in accordance with pre-stored environment data defining a simulation environment and pre-stored performance data defining the performance of the vehicle.

The primary motion system may be such as to enable the carriage to move in only two degrees of freedom. The primary motion system may be such as to enable the carriage to move in only three degrees of freedom. The primary motion system may be such as to enable the carriage to move in more than three degrees of freedom. The primary motion system may be such as to enable the carriage to move in only two translational degrees of freedom. The primary motion system may be such as to enable the carriage to move in only one rotational degree of freedom. That rotational degree of freedom may be about an axis perpendicular to the two, or to two of the, translational degrees of freedom provided by the primary motion system. The axis may be substantially vertical. Movement of the carriage by the primary motion system may be transmitted to the payload by virtue of a mechanical linkage extending between the carriage and the payload. That linkage may include the secondary motion system. The primary motion system may be such as to enable the payload to move in degrees of freedom not afforded by the secondary motion system. Those may be some or alternatively all of the degrees of freedom afforded by the primary motion system.

The secondary motion system may be such as to enable the payload to move in one, two, three or more three degrees of freedom. The secondary motion system may be such as to enable the payload to move in only three degrees of freedom. The secondary motion system may be such as to enable the payload to move in degrees of freedom not afforded by the primary motion system. Those may be some or alternatively all of the degrees of freedom afforded by the secondary motion system.

In combination the primary and secondary motion system may be capable of moving the payload with six degrees of freedom.

The system may comprise a bed supporting the carriage. The bed may extend in the directions in which the carriage can be caused to translate by the primary motion system. The bed may have a planar upper surface on which the carriage is supported. The upper surface of the bed may be horizontal. The bed may be stationary in the reference frame. The carriage may be contactlessly supported by the bed. The bed may be solid. The bed may constitute a floor on which the carriage runs.

There may be five or more of the cable drives. There may be five, six, seven, eight or more of the cable drives.

There may be a configuration of the carriage in which at least one of the cables is wound against the carriage in a first rotational direction and another of the cables is wound against the carriage in a second rotational direction, by virtue of which the carriage can be caused to rotate by operation of the cable drives. In this way the primary motion system can provide a rotational degree of freedom to the payload. Optionally, this degree of freedom may not be duplicated by the secondary motion system. The axis about which the carriage can be caused to rotate by the cable drives may be perpendicular to two of the degrees of freedom in which the carriage can be caused to translate by the cable drives. In the said configuration the said one of the cables and the said other of the cables may each wound around the carriage by at least 90°. In the said configuration all of the cables of the cable drives may be wound around the carriage by at least 90°.

The secondary motion system may comprise a plurality of linear actuators extending between the carriage and the payload. There may be three such actuators. There may be only three such actuators. The linear actuators may be arranged as a tripod. There may be six such actuators. The linear actuators may be arranged as a hexapod.

The linear actuators together may bear the entire weight of the payload.

The system may comprise a resilient mechanism acting between the payload and the carriage for partially bearing the weight of the payload. The resilient mechanism and the linear actuators may together bear the entire weight of the payload.

The secondary motion system may be capable of causing the payload to translate with respect to the reference frame in a degree of freedom different from the translational degrees of freedom provided by the primary motion system.

The secondary motion system may be capable of causing the payload to rotate with respect to the reference frame in each rotational degree of freedom not provided by the primary motion system.

The motion system may be a motion simulator for simulating the motion of a vehicle. The payload may be a simulated station for an operator of a vehicle under simulation. The payload may comprise a vehicle cockpit.

The primary motion system may provide motion of the station/cockpit in surge and sway. The secondary motion system may provide motion of the station/cockpit in roll, pitch and heave. The primary motion system may provide motion of the cockpit in yaw.

The system may comprise a control processor configured to coordinate operation of the cable drives to maintain the cables in tension as the carriage is moved.

The system may comprise means for preloading the cables independently of the cable drives.

Each cable drive may comprise a reel around which the respective cable is wound and a motor for driving the reel to rotate.

The present invention will now be described by way of example with reference to the accompanying drawings. In the drawings.

Figure 1:
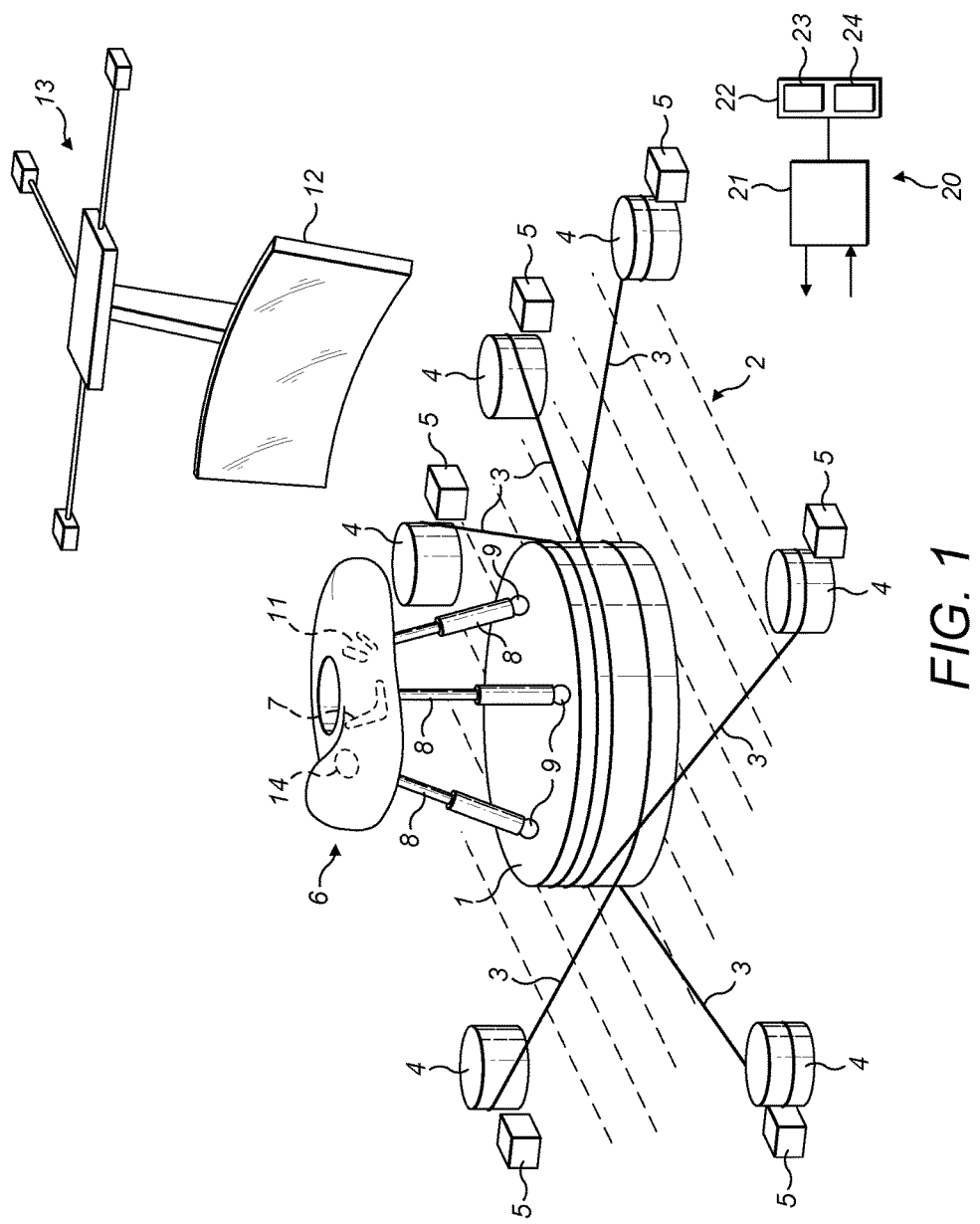
FIG. 1 shows a first design of vehicle simulator from the side and above.

The figures illustrate a motion platform configured for use as a road vehicle simulator. As will be described below, the principles of the motion platform can be used in other applications.

The motion platform of the figures comprises a carriage 1 which rests on a planar bed 2. The carriage is slidable on the bed. The carriage can be translated across the bed by means of cables 3 which extend between the carriage and capstans 4. Each capstan is arranged so that it can be driven to rotate by a respective motor 5. When the motor drives a capstan so as to wind cable on to the capstan the cable pulls on the carriage, and in that way the carriage can be urged to move over the bed. The carriage carries a payload 6. In this example the payload is configured to resemble a vehicle cockpit, having a seat 7 for an occupant. The payload is attached to the carriage by three linear actuators 8 arranged in a tripod form. Each linear actuator is attached at one of its ends to the carriage by a spherical joint 9, and at the other of its ends to the payload by a spherical joint 10. The linear actuators can be operated to adjust their length, thereby causing the payload to pitch, roll or heave relative to the carriage. This system provides the payload with six degrees of freedom relative to a reference represented by the bed 2. Pitch, roll and heave are provided by the linear actuators 8. Surge and sway are provided by the motors 5 being operated so as to translate the carriage across the bed. Yaw is provided by the motors 5 being operated to rotate the carriage about an axis perpendicular to the bed, as will be described in more detail below with reference to FIG. 3.

In order for an occupant of the simulator to influence the operation of the simulator, the cockpit is provided with vehicle controls 11, such as a steering wheel and brake and accelerator pedals. A video display unit 12 is arranged to provide the occupant with a view of a simulated environment. The video display unit could be carried by the payload or directly by the carriage or may be a VR headset worn by the occupant. Alternatively, the display unit could be a screen that is stationary with the bed. In the example of FIG. 1, the display unit is movable independently of the carriage and the payload, on a separate motion system shown generally at 13. Speakers 14 are provided on the payload for playing out sound to the occupant.

The behaviour of the system is controlled by a control unit 20. The control unit comprises a processor 21 and a memory 22. The memory stores non-transient program code 23 which is executable by the processor to cause the processor to drive the operation of the system, and environment code 24 which defines the environment that is being simulated. The environment code could define the visual appearance of the simulation environment, for display on display unit 12; the physical parameters of the simulation environment, for example track layout and frictional characteristics; and the characteristics of the vehicle being simulated, for example its acceleration, braking and steering response, its suspension characteristics and its sound. In operation, the processor receives inputs from the vehicle controls 11 and from position and/or force sensors which allow it to know the current state of the system. Those sensors could, for example, indicate any one or more of: the position, velocity and/or acceleration of the carriage and/or the payload and/or the display unit 12, the positional state and/or torque of each of the motors 5, and the positional state and/or force applied by each of the linear actuators 8. The processor executes the code 23 in dependence on the environment code 24 to determine appropriate outputs to control the system so as to provide the occupant with a convincing simulation of vehicle behaviour. The processor generates outputs that control the motors 5, the linear actuators 8 and the video motion system 13, a video stream to the display 12 and an audio stream to the speakers 14. Thus, as the occupant provides inputs by means of the vehicle controls 11 the motion of the payload and the content of the video and audio signals to the occupant are selected in accordance with the environment code 24.

The control unit can be communicatively coupled to send and receive signals form the sensors, the controls, the motors, the actuators and the display by either physical electrical or optical cables, or by wireless means.

The operation of the motion system will now be described in more detail.

Figure 2:
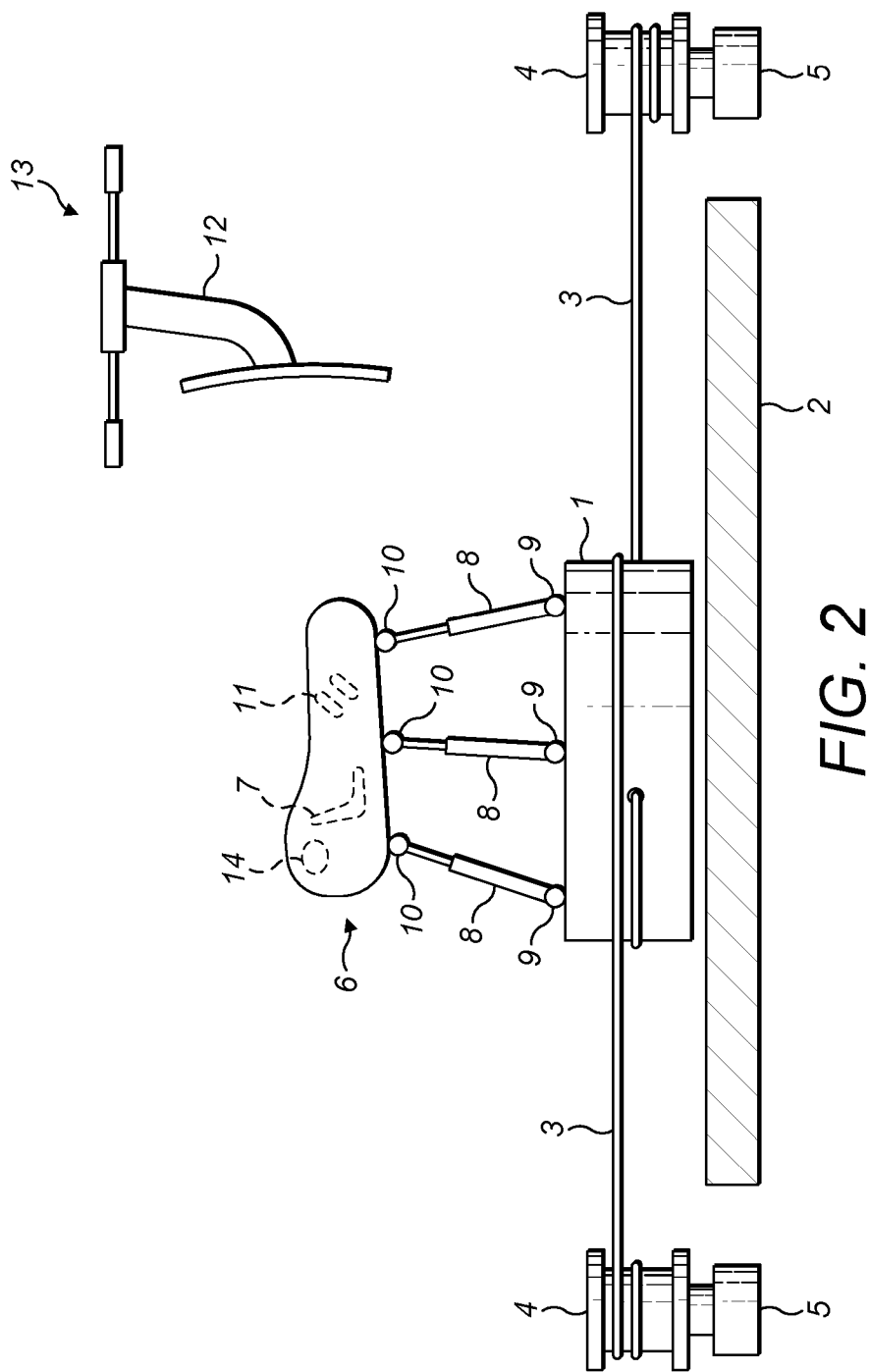
FIG. 2 shows a simplified side view of the simulator of FIG. 1.

As shown in FIG. 2, the carriage 1 runs on bed 2. Bed 2 is preferably planar and horizontal, since that corresponds to most common simulation environments, but it could be non-planar and/or inclined. Bed 2 supports all, or in the case of an inclined bed the majority of, the weight of carriage 1 and the payload 6. This is efficient because it avoids the need for the weight of the carriage to be supported by a structure that has to drive motion of the carriage. It is advantageous for the carriage to be freely movable over the bed. To that end the carriage could run on wheels or balls, or it could be supported contactlessly by the bed, for example by being suspended above the bed by means of pressurised fluid (e.g. air) or magnetic repulsion. Those same mechanisms could be used to reduce friction between the carriage and the bed whilst the carriage remains in contact with the bed. The bed could be solid or it could be liquid, in which case the carriage could float on the bed.

The capstans 4 are attached firmly with respect to the bed 2. A cable 3 extends from each capstan 4 to the carriage 1. One end of the cable is fixedly attached to the carriage. The cable then passes over the bed and is wound around the respective capstan. A respective one of the motors is coupled to each of the capstans so as to be able to cause the capstan to rotate and either pay out or draw in the cable under the control of the control unit 20. When a capstan is in particular configuration it constrains the position of the carriage to a zone around the capstan whose radius corresponds to the length of the free cable between the capstan and the carriage. In the example of FIG. 1 there are six capstans disposed around the bed 2. By setting each of the capstans in an appropriate configuration the position of the carriage on the bed can be defined unambiguously. The program code 23 is arranged so that once the processor 21 has determined a desired position of the carriage it generates control signals to the motors which cause them to rotate the capstans in a coordinated way so as to drive the carriage to the desired position and at the desired speed(s). When sufficient cables are provided that there is redundancy, it is not essential for all the cables to be maintained in tension at all times. However, the program code 23 is preferably designed to maintain all the cables in tension at all times when the system is in operation, since that maintains authority over the cables' positions and reduces the torque required from each individual capstan.

The capstans are arranged generally at the same level as the carriage so that the cables 3 run generally parallel to the bed 2. In the figures the capstans are shown with vertical rotation axes, but they could be disposed about different axes, for example horizontal axes. Each cable can conveniently be attached to the carriage at a different height above the bed from the neighbouring cables, to reduce the chance of the cables coming into contact with each other. Conveniently, the capstans are arranged in a regular way around the base, since this helps improve the fidelity of the movement of the carriage. In FIG. 1 the system has six capstans. There could be any number greater than three. There may be an even number of capstans and associated cables, or an odd number of capstans and associated cables. It has been established that the number of capstans and cables can conveniently be five, six or more preferably eight since that allows for good motion fidelity without an excess of apparatus. An increased number of capstans over the minimum is advantageous since then the torque that needs to be applied by any capstan for a given acceleration of the carriage is reduced, and the stiffness of the system is also increased.

Figure 3:
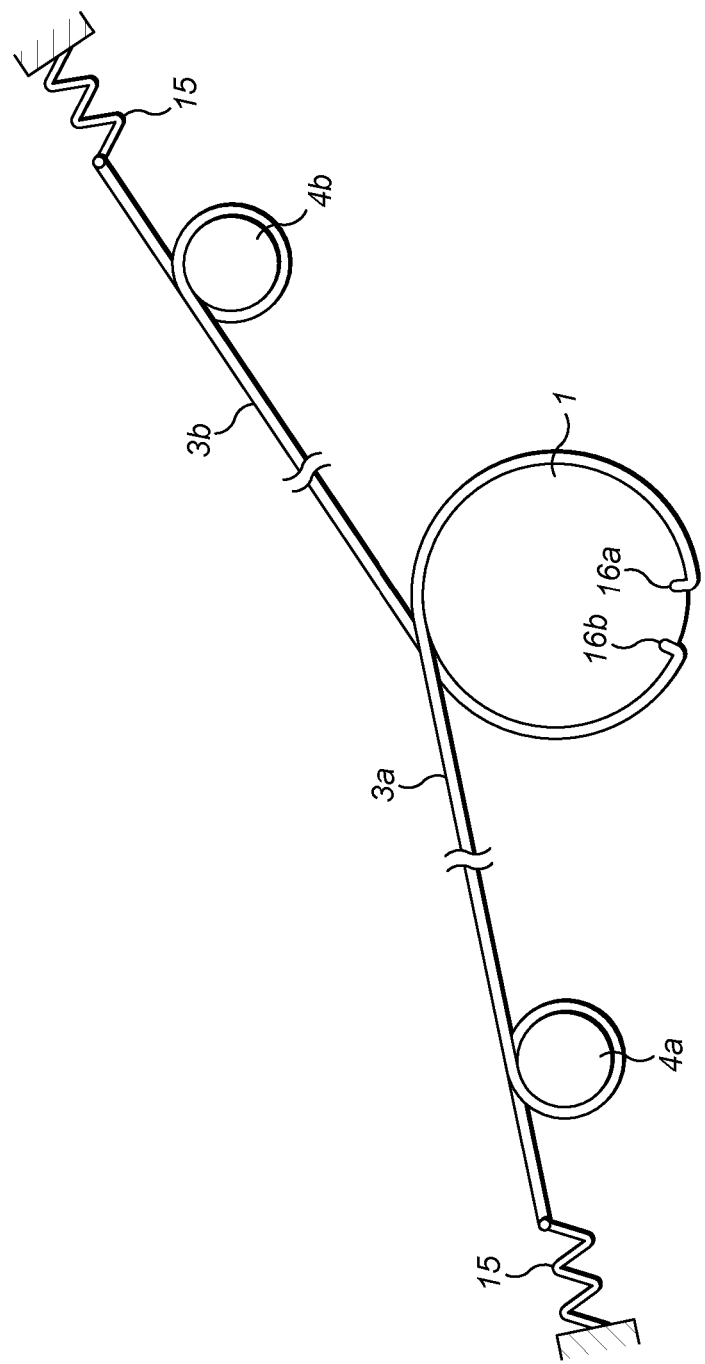
FIG. 3 is a plan view of part of the carriage of the simulator of FIG. 1, showing how two of the cables attach to it.

The required torque can also be reduced by pre-loading the cables independently of the motors. The end of each cable distal from the carriage could be fixed to the respective capstan. Alternatively the cable could wrap around the capstan in such a way as to provide a frictional drive from the capstan to the cable, and then the distal end of the cable could be attached to a preload mechanism such as a spring arranged in tension, or a suspended weight. FIG. 3 shows the distal end of each cable terminating at a spring 15 which holds the cable in tension. Alternatively the capstan could be preloaded independently of the primary cable 3 by means of a rotary spring acting directly on the capstan, or by means of a second cable which wraps around the capstan and runs to a spring (e.g. a fixed linearly-acting spring) or a suspended weight. These embodiments the permit distal end of the primary cable 3 to be directly attached to the capstan, reducing the chance of it slipping with respect to the capstan.

The cables are flexible lines which could be composed of any suitable material, for example metallic wire or plastics material. To improve the fidelity of the motion system the cables are preferably substantially inelastic.

The linear actuators 8 may, for example, be hydraulic or pneumatic rams or linear motor drives. The linear actuators are conveniently disposed regularly around the carriage 1. This can help to improve the range of motion of the payload. The linear actuators may collectively bear the entire weight of the payload. Alternatively, the linear actuators may be supplemented by a resilient support mechanism which supports part of the weight of the payload with respect to the carriage. The resilient support mechanism could comprise one or more springs that act between the payload and the carriage and are compressed by the weight of the payload. This can avoid the need for the linear actuators to support the entire static weight of the payload.

The frame of reference for motion of the carriage and/or the payload is taken to be the environment in which the bed is fixed. In that frame of reference, translation in two degrees of freedom (taken here to be surge and sway) is provided by the cable drive system in the manner described above.

As indicated above, motion of the payload in yaw is achieved by means of the motors 5. FIG. 3 is a simplified view of the system showing how two of the cables, 3a and 3b are attached to the carriage. Cable 3a extends from capstan 4a and cable 3b extends from capstan 4b. Capstans 4a and 4b are arranged so that they oppose each other across the bed 2. The cables are arranged so that in a neutral configuration of the carriage one cable winds to some extent around the carriage in a first rotational sense and the other cable winds to some extent around the carriage in the opposite rotational sense. In this example, cable 3a winds around the carriage in a clockwise sense when viewed from above, and cable 3b winds around the carriage in an anti-clockwise sense when viewed from above. The proximal end of each cable is then fixed to the carriage, as indicated at 16a, 16b. The remaining four cables are attached to the carriage in a similar way, preferably so that half wind clockwise around the carriage and half wind the other way. When more than three cables are provided there is redundancy in the system with respect to lateral translation of the carriage across the bed. That redundancy can be used to permit the lateral position of the carriage to be fixed in addition to its rotational position in yaw. When motion of the capstans is coordinated so that the clockwise-wound cables are paid out at the same time as the anti-clockwise-wound cables are wound in the carriage can be caused to rotate in a clockwise sense. When motion of the capstans is coordinated so that the anti-clockwise-wound cables are paid out at the same time as the clockwise-wound cables are wound in the carriage can be caused to rotate in an anti-clockwise sense. The motion of the capstans can be coordinated to isolate this yaw motion from translational motion in surge and sway. The program code 23 is configured so that the motors can be controlled to provide a desired yaw configuration independently of desired surge and sway positions.

The extent of motion in yaw is governed by the extent to which each cable is wound around the carriage. In one configuration of the carriage (e.g. a neutral position) each cable could extend more than 60°, more than 80°, more than 90°, more than 100°, more than 120°, more than 180°, more than 360°, more than 540° or more than 720° around the carriage. The cable drive system could provide yaw freedom of twice the chosen neutral wrapping angle. The cables could extend around the periphery of the carriage, as shown in FIG. 3, or they could extend around a hub inboard of the periphery of the carriage, the linear actuators 8 being supported on that hub.

The cables are free to unwind from the carriage over the entire length and/or rotational extent that they are considered to be wound around the carriage. The cables are preferably wound tightly against the carriage over the entire length that they are considered to be wound around the carriage, so that over that length they are bearing against and/or in contact with an exterior surface of the carriage.

Thus the cable drive system provides three independent degrees of freedom. The cable drive system provides no freedom in the remaining three senses of motion. Freedom in those senses of motion is provided exclusively by the linear actuators 8. Thus, preferably each of the primary cable drive system and the secondary drive system (which in this example is provided by the linear actuators) does not duplicate the freedom of motion provided by the other.

Buffers may be provided around the bed 2 to prevent the carriage leaving the bed.

The system described above can provide a number of advantages over other designs of motion platform. First, the use of cables to provide lateral motion can allow the payload to be free to move over a large base without the need for correspondingly large rails or linear actuators, making the simulator readily implemented on a large horizontal scale. This is especially significant in simulators intended to simulate high longitudinal accelerations, as in the case of motorsports simulators. The bed 2, could be a simple structure such as a concrete pad, which is easily built to a required size. Second, by restricting the cable-driven motions to exclude those having a vertical component there is no need for the cables to support the payload. This improves the fidelity of the motion system and avoids the need for the cable drives to be sized to bear the weight of the payload. Third, by arranging the cables so that they can drive the payload in yaw there is no need for a separate drive system for yaw motion. This reduces the inertia of the carriage and/or the payload over alternative designs.

In the example where the motion platform is to be used to simulate the motion of a motorsports vehicle, such as a racing car, the bed could be around 6 m across and the linear actuators 8 could provide around 20 cm of vertical travel.

The video display unit 12 may be moved by an auxiliary motion system 13. The auxiliary motion system is mechanically independent of the motion system that moves the payload. In this example, the auxiliary motion system is suspended from the walls or ceiling of a room enclosing the simulator. That avoids the potential for the video system interfering with the motion of the cables 3. The auxiliary motion system could also be a cable-driven system, similar to that which drives carriage 1. Alternatively the auxiliary motion system could be provided by the video system running on rails or other supports. The program code 23 is arranged to control the motion of the video motion system so that it shadows the motion of the payload, with the video display unit remaining in front of the occupant as the payload moves. However, the video display unit need not remain in a constant position relative to the payload since small changes in the relationship between them can be accommodated by the video image being transformed on the display without the occupant perceiving a change in physical relationship. The program code 23 is arranged to cause the video image to be transformed as required to provide a realistic visual sensation.

The bed 2 could be omitted. The weight of the carriage and the payload could then be borne by the cables 3 under tension.

The cables could be moved by linear actuators rather than rotational motors and/or capstans. The capstans could be provided directly on motor drive shafts or could be driven via gearboxes.

In the example above, rotation in yaw is provided by the cable drives constituted by the motors and the capstans. Alternatively, there could be a separate drive system for yaw motion. In one example the tripod of linear actuators 8 could be mounted on an intermediate platform which is carried by the carriage and is movable in yaw with respect to the remainder carriage by a dedicated yaw drive (e.g. an electric motor). In another example the dedicated yaw drive could be provided between the linear actuators and the payload.

The tripod of linear actuators 8 could be replaced by other mechanisms. In a simple example there could be a single linear actuator supporting the payload over the carriage, providing one degree of freedom for motion with a component perpendicular to the motions provided by the cable drive system. There could be two such linear actuators providing motion in two such degrees of freedom. The drive system for moving the payload with respect to the carriage could employ means other than linear actuators to drive its motion, for example a rotational drive arranged to act at a pivot of the payload with respect to the carriage.

The motion system described above can be used as a simulator for vehicles, for example land vehicles, boats and aircraft. The cockpit could advantageously be set up as appropriate to the vehicle being simulated. Alternatively the system can be used: (i) for sports motion simulations, for example to simulate skiing or cycling; or (ii) as a camera platform; or (iii) in industrial applications, for example for moving items on a production line, in a warehouse or for moving containers in a container terminal; or (iv) generally as an industrial robot. In each case the payload can be configured with operational tools such as a grasping tool, a magnetic attachment device, a carrying platform, a camera, a drill, a lamp or a wrench.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A road vehicle simulator comprising:
    a planar bed;
    a carriage slidable on the planar bed such that the planar bed provides support for all weight of the carriage and allows substantially frictionless movement in a horizontal plane of the planar bed;
    a payload attached to the carriage such that the planar bed provides support for all weight of the payload, the payload resembling a cockpit of a vehicle and comprising a seat for an occupant, vehicle controls, and speakers for providing sound to the occupant, the payload being attached to the carriage by three linear actuators arranged in a tripod form, each linear actuator having a first end attached to the carriage by a first spherical joint and a second end attached to the payload by a second spherical joint;
    a video display unit configured to provide the occupant with a view of a simulated environment, the video display unit being independently movable relative to the carriage and the payload;
    a first capstan attached to the planar bed, the first capstan comprising a first drive motor configured to rotate the first capstan;
    a first flexible cable arranged substantially parallel to the planar bed and extending from (i) a first spring of a first preload mechanism such that a first end of the first flexible cable terminates at the first spring to (ii) the first capstan in which the first flexible cable is wrapped around to provide a frictional drive from the first capstan to the first flexible cable to (iii) the carriage in which the first flexible cable is wound against the carriage in a first rotational direction such that a second end of the first flexible cable terminates at the carriage;
    a second capstan attached to the planar bed, the second capstan comprising a second drive motor configured to rotate the second capstan;
    a second flexible cable arranged substantially parallel to the planar bed and vertically offset from the first flexible cable, the second flexible cable extending from (i) a second spring of a second preload mechanism such that a distal end of the second flexible cable terminates at the second spring to (ii) the second capstan in which the second flexible cable is wrapped around to provide a frictional drive from the second capstan to the second flexible cable to (iii) the carriage in which the second flexible cable is wound against the carriage in a second rotational direction opposite the first rotational direction such that a second end of the second flexible cable terminates at the carriage;
    a third capstan attached to the planar bed, the third capstan comprising a third drive motor configured to rotate the third capstan;
    a third flexible cable arranged substantially parallel to the planar bed and vertically offset from the first flexible cable and the second flexible cable, the third flexible cable extending from (i) a third spring of a third preload mechanism such that a distal end of the third flexible cable terminates at the third spring to (ii) the third capstan in which the third flexible cable is wrapped around to provide a frictional drive from the third capstan to the third flexible cable to (iii) the carriage in which the third flexible cable is wound against the carriage in the first rotational direction or the second rotational direction such that a second end of the third flexible cable terminates at the carriage; and
    a control unit comprising a processor configured to:
        define the simulated environment and characteristics of a vehicle being simulated based on inputs from the vehicle controls;
        control the first drive motor, the second drive motor, and the third drive motor to achieve a desired surge position, a desired sway position, and a desired yaw of the payload based on the simulated environment and characteristics of the vehicle, wherein the first drive motor, the second drive motor, and the third drive motor are controllable to provide the desired yaw independently of the desired surge and sway position; and
        control the three linear actuators to achieve a desired pitch and a desired roll of the payload based on the simulated environment and characteristics of the vehicle.

2. The road vehicle simulator as claimed in claim 1, wherein the planar bed extends in each direction in which the carriage is movable.

3. The road vehicle simulator as claimed in claim 1, wherein the carriage is translatable in two or more degrees of freedom with respect to a reference frame and rotatable through at least 90° by operation of the first, second and third drive motors.

4. The road vehicle simulator as claimed in claim 3, wherein the planar bed has a planar upper surface on which the carriage is supported, the planar upper surface of the planar bed is horizontal, the planar bed is stationary in the reference frame, and the carriage is contactlessly supported by the planar bed.

5. The road vehicle simulator as claimed in claim 1, comprising:
    a fourth capstan attached to the planar bed, the fourth capstan comprising a fourth drive motor configured to rotate the fourth capstan; and
    a fourth flexible cable arranged substantially parallel to the planar bed and vertically offset from the first, second and third flexible cables and extending from (i) a fourth spring of a fourth preload mechanism such that a first end of the fourth flexible cable terminates at the fourth spring to (ii) the fourth capstan in which the fourth flexible cable is wrapped around to provide a frictional drive from the fourth capstan to the fourth flexible cable to (iii) the carriage in which the fourth flexible cable is wound against the carriage in the first rotational direction or the second rotational direction such that a second end of the fourth flexible cable terminates at the carriage;
    wherein the processor is configured to control the fourth drive motor to achieve the desired surge position, the desired sway position, and the desired yaw of the payload based on the simulated environment and characteristics of the vehicle, wherein the fourth drive motor is controllable to provide the desired yaw independently of the desired surge and sway position.

6. The road vehicle simulator as claimed in claim 5, comprising:
a fifth capstan attached to the planar bed, the fifth capstan comprising a fifth drive motor configured to rotate the fifth capstan; and
a fifth flexible cable arranged substantially parallel to the planar bed and vertically offset from the first, second, third and fourth flexible cables, the fifth flexible cable extending from (i) a fifth spring of a fifth preload mechanism such that a distal end of the fifth flexible cable terminates at the fifth spring to (ii) the fifth capstan in which the fifth flexible cable is wrapped around to provide a frictional drive from the fifth capstan to the fifth flexible cable to (iii) the carriage in which the fifth flexible cable is wound against the carriage in the first rotational direction or the second rotational direction such that a second end of the fifth flexible cable terminates at the carriage;
wherein the processor is configured to control the fifth drive motor to achieve the desired surge position, the desired sway position, and the desired yaw of the payload based on the simulated environment and characteristics of the vehicle, wherein the fifth drive motor is controllable to provide the desired yaw independently of the desired surge and sway position.

7. The road vehicle simulator as claimed in claim 6, comprising:
a sixth capstan attached to the planar bed, the sixth capstan comprising a sixth drive motor configured to rotate the sixth capstan; and
a sixth flexible cable arranged substantially parallel to the planar bed and vertically offset from the first, second, third, fourth and fifth flexible cables, the fifth flexible cable extending from (i) a fifth spring of a fifth preload mechanism such that a distal end of the fifth flexible cable terminates at the fifth spring to (ii) the fifth capstan in which the fifth flexible cable is wrapped around to provide a frictional drive from the fifth capstan to the fifth flexible cable to (iii) the carriage in which the fifth flexible cable is wound against the carriage in the first rotational direction or the second rotational direction such that a second end of the fifth flexible cable terminates at the carriage;
wherein the processor is configured to control the sixth drive motor to achieve the desired surge position, the desired sway position, and the desired yaw of the payload based on the simulated environment and characteristics of the vehicle, wherein the sixth drive motor is controllable to provide the desired yaw independently of the desired surge and sway position.

8. The road vehicle simulator as claimed in claim 7, wherein at least one of the first, second, third, fourth, fifth and sixth cables is wound around the carriage by at least 90°.

9. The road vehicle simulator as claimed in claim 7, wherein all of the first, second, third, fourth, fifth and sixth cables are wound around the carriage by at least 90°.

10. The road vehicle simulator as claimed in claim 1, wherein at least one of the first, second and third cables is wound around the carriage by at least 90°.

11. The road vehicle simulator as claimed in claim 1, wherein all of the first, second and third cables are wound around the carriage by at least 90°.

12. The road vehicle simulator as claimed in claim 1, wherein the processor is configured to coordinate operation of the cable drives to maintain the first, second and third cables in tension as the carriage is moved.

13. The road vehicle simulator as claimed in claim 1, comprising an auxiliary motion system that is mechanically independent from the first drive motor, the second drive motor, and the third drive motor, wherein the video display unit is moveable by the auxiliary motion system.

14. The road vehicle simulator as claimed in claim 13, wherein the auxiliary motion system is suspended from a ceiling or walls.

* * * * *

UNITED STATES PATENT AND TRADEMARK OFFICE
CERTIFICATE OF CORRECTION

PATENT NO. : 12,165,542 B2
APPLICATION NO. : 15/757246
DATED : December 10, 2024
INVENTOR(S) : Peter Brice and Steve Houghton Page 1 of 1

It is certified that error appears in the above-identified patent and that said Letters Patent is hereby corrected as shown below:

In the Specification

Column 1, Lines 8-12, delete "Application No. PCT/GB2016/052702, filed on Sep. 1, 2016, which claims priority to British Application No. GB1515730.8, filed on Sep. 4, 2015. The contents of both of these priority applications are hereby incorporated by reference in their entirety."

And insert at Line 7, after "PCT" -- Application No. PCT/GB2016/052702, filed on Sep. 1, 2016, which claims priority to British Application No. GB1515730.8, filed on Sep. 4, 2015. The contents of both of these priority applications are hereby incorporated by reference in their entirety. --

Signed and Sealed this
Eleventh Day of March, 2025

Coke Morgan Stewart
*Acting Director of the United States Patent and Trademark Office*